United States Patent [19]
Hershire

[11] 3,818,598
[45] June 25, 1974

[54] MEASURING DEVICE

[75] Inventor: Kent M. Hershire, Fort Madison, Iowa

[73] Assignee: E-Z Read Metric Rule, Inc., Houston, Tex.

[22] Filed: Nov. 3, 1972

[21] Appl. No.: 303,617

[52] U.S. Cl. .................................. 33/161, 33/143 K
[51] Int. Cl. ............................................ G01b 3/08
[58] Field of Search ....... 33/161, 107 R, 109, 143 R

[56] References Cited
UNITED STATES PATENTS

| | | | |
|---|---|---|---|
| 2,551,671 | 5/1951 | Harris | 33/143 K |
| 3,383,771 | 5/1968 | Alteneder | 33/107 R |

Primary Examiner—William D. Martin, Jr.
Assistant Examiner—Willis Little
Attorney, Agent, or Firm—Thomas E. Frantz

[57] ABSTRACT

A rule for measuring meters or other units and subdivisions thereof, the rule comprising a body section having indicia which defines units of measure, there being provided at one end of the body section a longitudinally movable head section having indicia which defines sub-divisions of one unit of measure. Movement of the head section is accomplished by means of a motion translating mechanism which is actuated upon manual rotation of a dial, or the like, the dial having readily viewed indicia which indicates the distance the head section is projected from the body section upon actuation of the mechanism.

8 Claims, 3 Drawing Figures

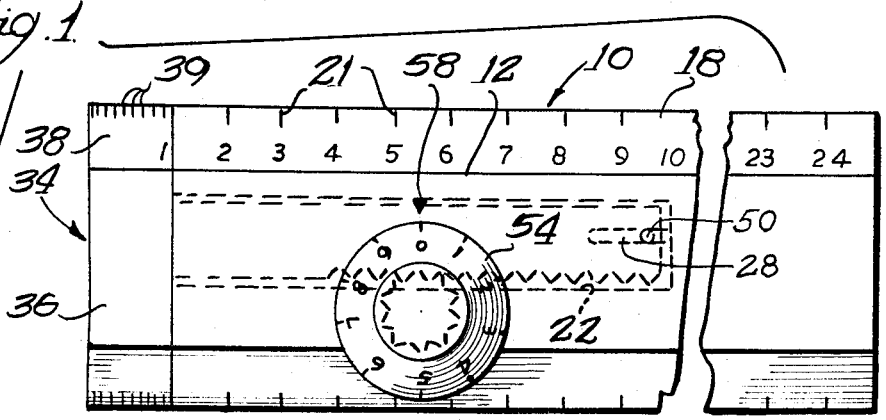
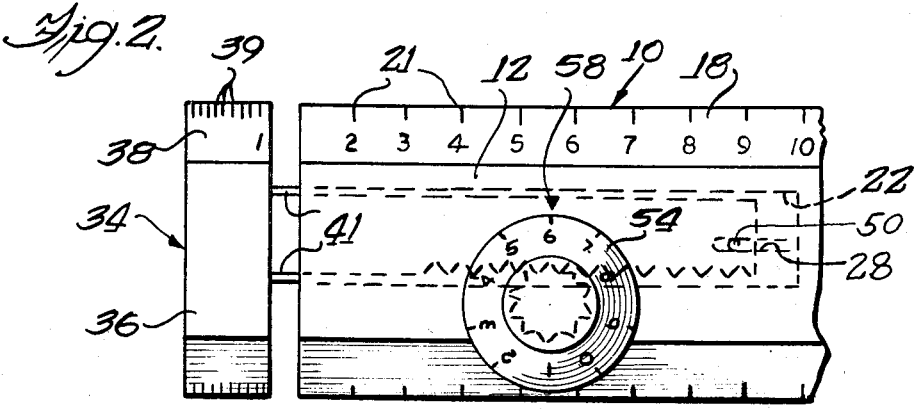
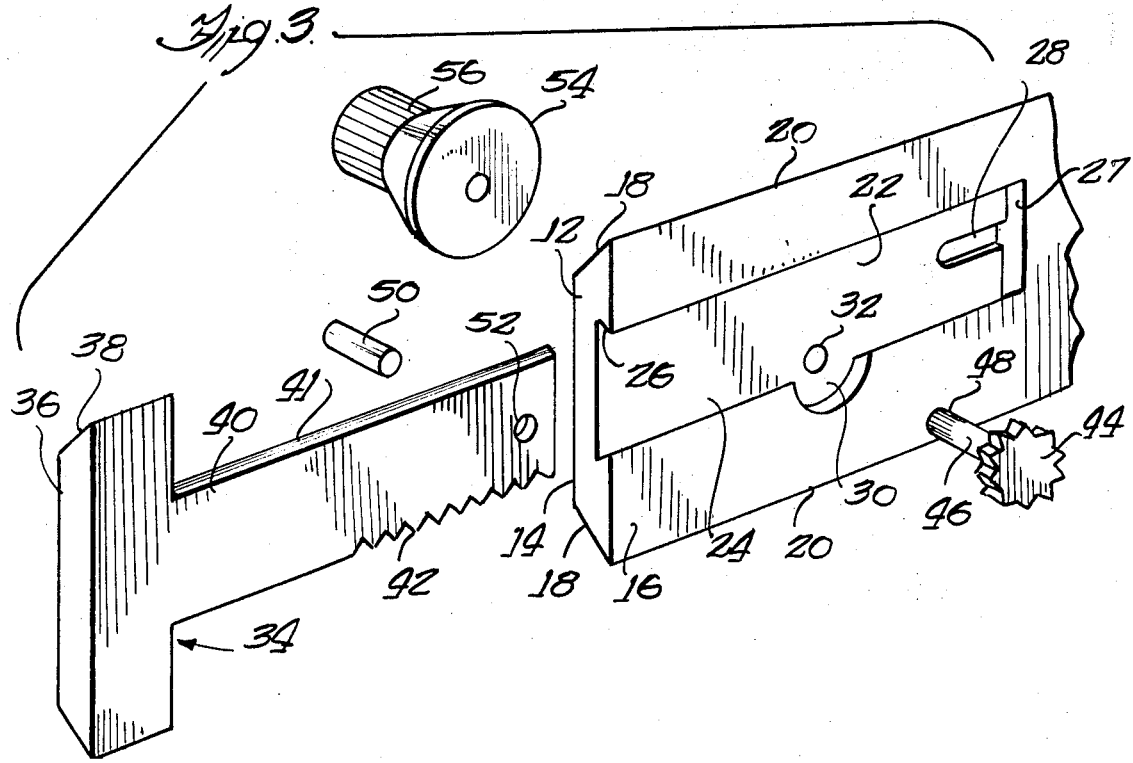

MEASURING DEVICE

BACKGROUND OF THE INVENTION

1. Field of the Invention

The present invention relates to measuring rules, and more particularly to a measuring device having an extendable end portion.

2. Description of the Prior Art

The conventional measuring rule consists of an elongate strip of plastic or metal, the edges of the strip being provided with indicia which defines units and sub-units of measure, such as inches or meters. If the rule is intended for professional or industrial use, the indicia or graduations generally are machined or otherwise precisely formed in the strip to assure extreme accuracy. The gradations on rules intended for home, classroom or hobby use, however, are formed directly in the mold (if the rule is plastic) or applied by hot stamping, lithography, or the like. These methods of application are inexpensive and fast, but result in broad and indistinct graduation lines which at best are difficult to delineate, particularly when it is necessary to refer to sub-division lines.

Even with high precision rules, it is difficult to delineate accurately minute sub-divisions, and for this reason vernier scales and the like have been adapted in various ways to high precision measuring rules. Obviously such high precision vernier type rules are far too expensive for home, hobby and/or general classroom use. The average housewife, student, hobbiest, etc., thus, has been left, over the years, to struggle — many times unsuccessfully — with the usual inexpensive, poorly marked, difficult-to-read rule.

It now appears to be the general consensus that in the not too distant future, the United States will officially adopt the metric system as used almost universally throughout the rest of the world. The significant ramifications of such a change to industry, of course, have been widely recognized. The impact upon housewives, hobbiests, do-it-yourselfers, students, etc., however, has received little attention. Thus, such individuals would be faced not only with the problems discussed above with respect to the usual inexpensve rules, but the additional confusion and uncertainty which would result from lack of familiarity with the metric system.

SUMMARY OF THE INVENTION

It is a principal object of the present invention to provide an improved measuring device.

It is another object of this invention to provide an improved measuring device having an extendable end portion useful in delineating sub-divisions of units of measure.

A still further object of the present invention is the provision of an improved measuring device adapted particularly for use with the metric system of measurement.

Still another object of this invention is to provide a measuring device of the above nature, characterized by simplicity, reliability, low cost, ease and convenience in use, and wide applicability.

These and other objects of the present invention will become apparent from the following description taken in conjunction with the accompanying drawings which illustrate a preferred embodiment thereof.

The present invention provides an improved measuring device comprising an elongate body section, the edges of which are marked with units of measure, such as centimeters. One surface of the body section includes an elongate recess opening through one end of the body, the recess snugly and slidingly receiving an arm which carries at its outer end a head section having substantially the same cross-sectional configuration as the body section. The edges of the head section are provided with indicia defining millimeters or other sub-divisions of one of the units of measure provided on the body section. A manually actuable mechanism operatively engages the body section and the arm to move the head section between a retracted position wherein the sub-divisions thereon form a direct continuation of the units of measure on the body portion, and a projected position wherein the sub-divisions are spaced from said units. Indicia is provided by the operating mechanism whereby the user can readily determine the extent of projection of the head portion from the body section in terms of the sub-divisions of the units of measure.

BRIEF DESCRIPTION OF THE DRAWINGS

In the drawings:

FIG. 1 is a plan view of a measuring device illustrating one embodiment of the present invention;

FIG. 2 is a fragmentary plan view of the embodiment illustrated in FIG. 1, showing a change in the position of the parts; and FIG. 3 is an exploded bottom elevational view showing the operating parts of the embodiment illustrated in FIG. 1.

DESCRIPTION OF THE PREFERRED EMBODIMENT

In the embodiment illustrated in the drawings, the measuring device 10 includes an elongate body section 12 molded or otherwise formed of a strong, dimensionally stable plastic, such as high impact styrene, high density poly-propylene, or the like. The length of the body section 12 may be varied, depending upon the manner in which the measuring device is to be employed, but in the present embodiment it is shown as being 24 centimeters long. As best illustrated in FIG. 3, the body section 12 is generally trapezoidal in cross-sectional configuration, the top and bottom surfaces 14 and 16, respectively, being parallel and the edge surfaces 18 sloping outwardly from the top surface to provide the usual feather edges 20. The edge surfaces 18 are provided with indicia 21 which preferably represent centimeters. It will be understood by those in the art, however, that other units of measure may be employed, such as inches.

Referring particularly to FIG. 3, it will be noted that the lower surface 16 of the body section 12 is provided with a longitudinally disposed, elongate recess or groove 22 which extends through the end surface of the body section 12 to define an aperature therein. Defined by the groove 22 is an inner support surface 24 disposed generally parallel to top and bottom surfaces 14 and 16, and sloping or offset side support surfaces 26. Adjacent to the inner or back edge 27 of the groove 22 is a shallow slot 28, the purpose of which will be described in further detail hereinafter.

Intermediate the ends of the groove 22 is a semi-circular recess 30 which opens into and is of the same depth as groove 22. Bore 32 is concentric with recess 30 extending therefrom through the top surface 14 of the body section 12.

At one end of the body section 12 there is provided a generally T-shaped slide portion 34, which consists of a head section 36 of the same general cross-sectional size and configuration as the body section 12. Thus, when in a retracted position as illustrated in FIG. 1, the head section forms a smooth continuation of the body section 12.

It will be understood, of course, that the slide portion 34 and associated structure to be described hereinafter, may be provided at either end of the measuring device, although in the preferred embodiment, it is disposed at the left end thereof.

The sloping edge surfaces 38 of the head section 36 carry indicia 39 defining millimeter units which form a direct continuation of the centimeter marks 21 on the edge surfaces 18 when the head section is retracted.

Referring again particularly to FIG. 3, support means consisting of an elongate arm 40 extends transversely from head section 36 into groove 22. The arm 40 has the same general cross-sectional configuration as groove 22, but it is slightly smaller in width to provide for reciprocal sliding movement in the groove. Formed on one edge 41 of the arm 40 facing recess 30, is a gear rack section 42.

A driver or pinion gear 44 is rotatably disposed in the semicircular recess 30 in engagement with the gear rack section 42. This pinion gear is maintained in operating position by shaft 46, the diameter of which is slightly smaller than bore 32 through which it extends in a rotatable relationship. The pinion gear 44 and shaft 46 may be molded as an integral part, or if the shaft is formed of metal, it may be press fitted to the pinion gear.

The shaft 46 is long enough to extend beyond the top surface 14 of the body section 12 and preferably is provided at its upper end with a knurled or otherwise roughened surface 48.

The side support surfaces 26 of the groove 22 and corresponding edges 41 of the arm 40 are offset as by being sloped inwardly toward bottom surface 16, to provide means for supporting and maintaining the body section 12 and slide portion 34 in an assembled slidable relationship. To prevent movement of the arm 40 longitudinally out of groove 22, there is provided an extension or pin 50 which is press-fitted through the bore 52 of the arm 40 and into the slot 28, the forward end of which provides a shoulder adapted to engage and limit movement of the pin 50. Preferably, the length of the slot 28 is such as to limit movement of the slide portion to no more than ten millimeters. Thus, after assembly of the pin 50, the arm 40 is maintained against loss from groove 22 through the combined action of the above described support surfaces 24 and 26 and stop pin 50.

Press-fitted onto the exposed upper end 48 of the shaft 46 is a dial member 54. The dial member includes an inwardly sloping frustuconical section carrying indicia defining ten units of message, the upper end of the dial terminating in a knurled or otherwise easily grasped cylindrical portion 56. A reference point 58 is provided on the body section 12 for use in conjunction with the indicia on the dial 54.

In assembling the measuring device of the above described embodiment, the bar portion 40 is aligned with the outer end of the recess 22 and pushed longitudinally thereinto until the head portion 36 is in engagement with the body section 12, as illustrated in FIG. 1. The pinion gear 44 is then placed in the semi-circular recess 30 in engagement with the gear rack section 42, with the shaft 46 extending through bore 32. The dial member 54 is then press-fitted on the knurled end of the shaft 46. Final assembly is accomplished by pressing pin 50 through bore 52 into slot 28.

In using the device of the present embodiment, the centimeter marks 21 are used in a normal manner for measuring whole centimeter units. For example, a space nine centimeters would merely be measured from the extreme outer edge of the head section 36 to the ninth full mark on the scale. Whole millimeter units likewise could be measured by use of the millimeter lines 39 on the head section 36, but such markings, being small and close together, would be quite difficult to read. Instead, by using this invention, the millimeter units 39 may be much more easily measured and read. For example, in measuring a distance of 9.5 centimeters, the extreme end of the head portion 36 is positioned against one of the marks or edges and held thereagainst while the dial member 54 is rotated to extend the body section 12 until one of the centimeter marks thereon becomes aligned with the other mark or edge. The measurement then is read as the number of centimeters shown on the scale plus the millimeters indicated on the dial member 54.

In laying out a line of predetermined length of, say, 11.4 centimeters, the dial 54 is rotated to the fourth mark, thus extending the head section 36 a distance of 4 millimeters. The line is then transferred to the surface being marked, using the outer end of head section 36 as one point, and the 11th centimeter mark as the other.

It is understood, of course, that the teeth of pinion gear 44 and rack 42 necessarily must be calculated to provide one millimeter of movement of the slide portion 34 for each millimeter designation moved by the dial member 54.

It will be understood, also, that measuring devices of the type hereinafter claimed may be provided in various sizes and with various units of measure provided thereon.

Although but a single embodiment of my invention has been disclosed and described herein, it is obvious that many changes may be made in the size, shape, detail, and arrangement of the various elements thereof, all without departing from the spirit and scope of the appended claims.

I claim:

1. A measuring device comprising an elongate generally flat body section terminating at one end in a flat end surface disposed substantially perpendicular to the longitudinal axis of said body section, at least one of the side edges of said body section being provided with indicia defining units of measure, characterized by A. a slide portion carried adjacent said one end of said body portion, said slide portion including 1. a head section of substantially the same cross section size and configuration as said body section, said head section a. extending outwardly from said one end externally of said body section, b. being arranged in axial alignment with said body portion to form a uniform continuation thereof, and c. provided along at least one edge thereof with indicia aligned with the indicia on said body portion and defining subdivisions of one of said units of measure, and 2. support means comprising an elongate arm extending transversely from one end of said head section for engagement with said body section, B. longitudinally extending support surfaces provided in said body section, said support surfaces 1. opening through said end surface of said body section to define an aperature sized to receive said elongate arm, and 2. being positioned to slidingly support said arm and permit only longitudinal reciprocal movement thereof relative to said body section, and C. manually actuable operating means mounted on said body section and operatively engaging said arm for moving said slide portion between 1. a retracted position wherein said head section is contiguous with said body section and said subdivisions form a direct continuation of said units of measure, and 2. a projected position wherein said head section is spaced from said body section, D. said operating means being provided with indicia which indicate the extent of movement of said head section away from said body section in response to actuation of said operating means.

2. A measuring device according to claim 1, wherein

A. said support surfaces are defined by a longitudinally disposed groove formed in one of the outer surfaces of said body section and opening through said end surface thereof, the sides of said grooves diverging from one another and from a plane disposed perpendicular to the surface in which said groove is formed.

3. A measuring device according to claim 11, wherein

A. said groove and said arm are generally complimentary in cross-sectional configuration, said arm being snugly yet slidingly engaged in said groove for limited longitudinal reciprocal movement therein.

4. A measuring device according to claim 4, wherein

A. said operating means includes 1. a manually accessible member rotatably disposed on said body section, and 2. an actuating portion extending from said rotatable member into said groove in operative engagement with one edge of said arm.

5. A measuring device according to claim 4, wherein

A. said rotatable member comprises a dial which is provided with indicia defining a plurality of equally spaced segments, B. said actuating portion includes 1. a shaft journaled in said body section adjacent said recess for rotation with said dial, and 2. a driver carried by and rotatable with said shaft, said driver being engaged with said one edge of said arm to move said slide portion longitudinally relative to said body section upon rotation of said dial.

6. A measuring device according to claim 5, wherein

A. said driver comprises a pinion gear, and

B. a gear rack section is provided along said one edge of said arm in engagement with said pinion, and C. means is provided for limiting the longitudinal reciprocal movement of said slide portion away from said body section.

7. A measuring device according to claim 6, wherein said limiting means comprises A. a shoulder provided by said body portion contiguous with said groove, and B. an extension provided on said arm adapted to abutt said shoulder upon movement of said slide portion to said extended position.

8. A measuring device according to claim 6, wherein

A. said segments on said dial are numbered consecutively, each segment defining a space greater than one of said sub-divisions of measure, and B. said pinion gear and rack move said slide portion a distance equal to one of said sub-divisions of measure in response to rotation of said dial through an arc equivalent to one of said segments.

* * * * *

UNITED STATES PATENT OFFICE
CERTIFICATE OF CORRECTION

Patent No. 3,818,598　　　　Dated June 25, 1974

Inventor(s) Kent M. Hershire

It is certified that error appears in the above-identified patent and that said Letters Patent are hereby corrected as shown below:

Column 3, line 61, "message" should read -- measure --.

In The Claims:

Claim 3, line 1, the numeral "11" should read -- 2 --.

Claim 4, line 1, the numeral "4", second occurrence, should read -- 3 --.

Signed and sealed this 1st day of October 1974.

(SEAL)
Attest:

McCOY M. GIBSON JR.
Attesting Officer

C. MARSHALL DANN
Commissioner of Patents